UNITED STATES PATENT OFFICE.

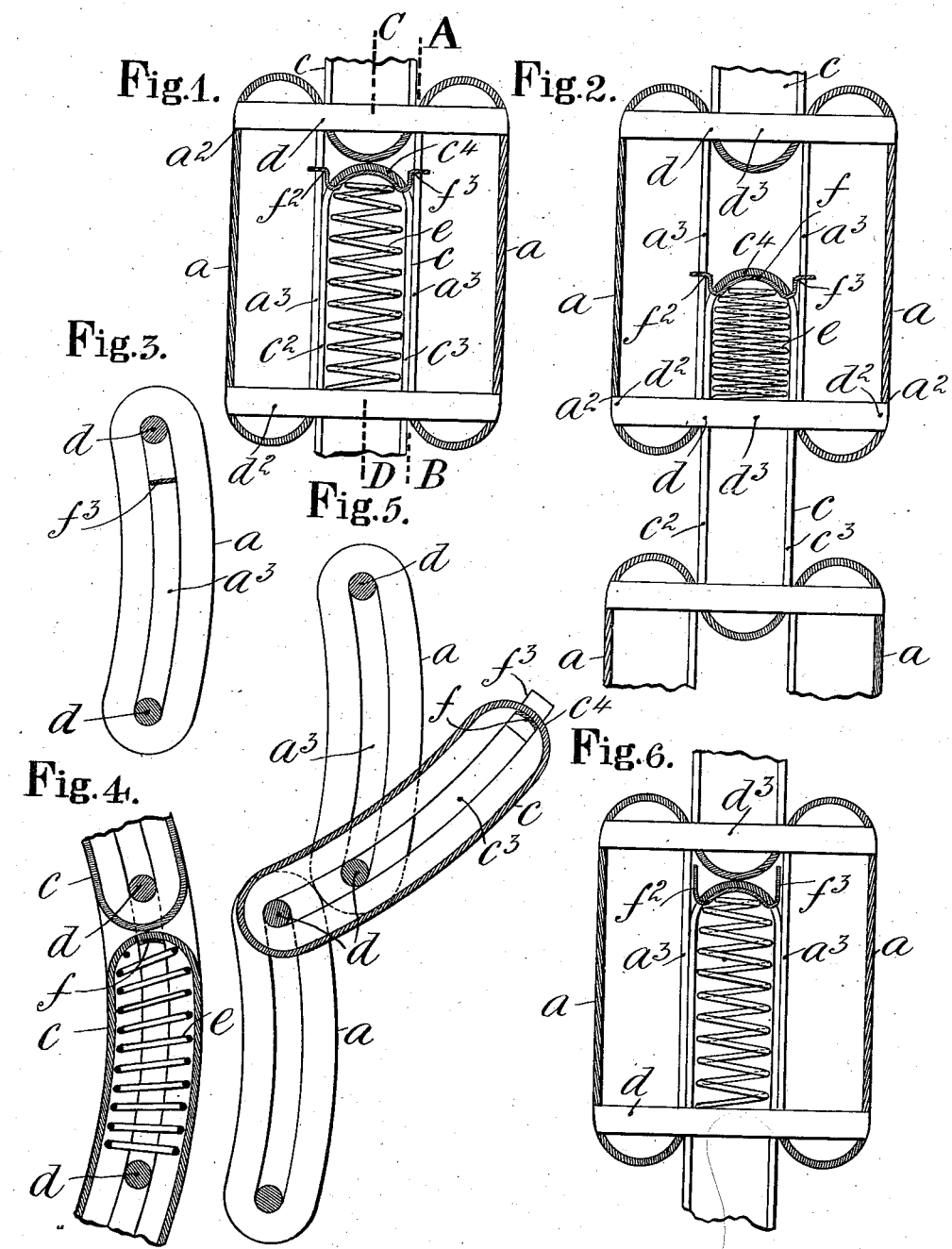

KEVITT ROTHERHAM, OF COVENTRY, ENGLAND.

FLEXIBLE AND EXPANSIBLE BRACELET.

1,028,788.

Specification of Letters Patent. Patented June 4, 1912.

Application filed March 16, 1912. Serial No. 684,250.

*To all whom it may concern:*

Be it known that I, KEVITT ROTHERHAM, a subject of the King of Great Britain, residing at 27 Spon street, Coventry, in the county of Warwick, England, have invented certain new and useful Improvements in Flexible and Expansible Bracelets, and do hereby declare that the following is a full, clear, and exact description of the same.

The invention relates to flexible and expansible bracelets of the kind made endless and built up of a number of pairs of outer links, and a number of inner links which are of hollow construction and contain small delicate coiled springs in compression. Such a bracelet is usually made throughout of gold, the springs, which are very sensitive in action, being also made of this metal. Transverse pivots, one at each end of the outer links, serve to rigidly couple the outer links of each pair, and pass through longitudinal side slots of the inner links so as to connect said outer links and inner links together longitudinally of the bracelet, with each spring in compression between the one end of the inner link and an adjacent pivot. The latter usually takes the form of a very small diameter tube length, over which an additional tube is slipped to distance apart the outer links prior to the ends of the pivot tube being displaced, expanded or riveted up at the outer faces of the outer links. Each outer link is usually of a hollow construction entirely closed except upon its inner side, which slidably abuts against the side of the inner link. In connection with this type of bracelet the invention provides constructional improvements enabling soldered pivot pins to be conveniently used instead of riveted, or expanded, ones, and the small coiled springs to be placed in position after the whole of the soldering of said pivot pins has taken place. In this way said springs, which are exceedingly delicate in construction and sensitive in action, have their maximum amount of efficiency when in position, and there is no possibility of the pivot pins becoming loose or insecure. Further, by the use of soldered pivot pins the distancing tubes usually used are dispensed with, as the outer links are fixed apart by the soldering, so that there is a saving of valuable metal and a slightly longer spring action consequent upon the pivot pin being of very small diameter where it passes across the space between the two opposite links of each pair. The longer the spring action, or the longer the spring, in such a bracelet the greater the expansion in the bracelet to pass over the hand, and the softer the grip on the wrist of the wearer.

The constructional improvements hereinbefore indicated will be hereinafter fully described in connection with the drawings, which show a rounded-end pattern of link.

Figure 1 is a face section of a portion of the finished bracelet in the contracted condition. Fig. 2 is a similar section of the expanded condition. Fig. 3 is a side section of Fig. 1 on the dotted lines, A, B, looking to the right. Fig. 4 is a side section of Fig. 1 on the dotted lines, C, D, looking also to the right. Fig. 5 is a side section of a number of connected together links after the pivot pins have been soldered in, and prior to the spring being put into position within the inner link, this representation showing the position of the inner link for introducing the spring. Fig. 6 is a face section similar to Fig. 1 after the spring has been put in position within the inner link, to show how the one end of the inner link can afterward be efficiently connected in a slidable manner with the outer links of a pair.

The bracelet is built up of pairs of outer links such as $a\ a$, and a number of inner and intermediate links such as $c$, connected to each other longitudinally of the bracelet by transverse pivot pins $d$. These latter at $d^2$ fit holes $a^2$ in the outer links, and are soldered therein to rigidly couple and distance said links apart in pairs, each link $a$ being hollow and closed except upon its inner side where a longitudinal slot $a^3$ is provided of the same width as the diameter of the pivot pins. The latter are as small in diameter as possible consistent with the necessary strength, in order to save metal and provide a small diameter at the middle parts $d^3$ of said pins; it being, so far, part of the invention to distance apart the outer links by the soldered-in pivot pins, which obviates the necessity of using distancing tubes over the pivot pins to distance the outer links apart, and are in themselves securely applied. In order to permit of the use of soldered in pivot pins, as aforesaid, the springs of the bracelet must be put in position within the hollow inner links after the said soldering has taken place. If the springs were in position during the soldering their efficiency would be most seriously impaired by the heat due to soldering.

The invention combines with the soldered pivot pins, aforesaid, means provided upon the inner links at the one end for permitting the engagement of said end with the opposite slots $a^3$ of the pair of outer links after the whole of the soldering of the pivot pins has taken place, and the spring has been put into position. Each inner link is provided with opposite slots $c^2$, $c^3$, through which two adjacent pivot pins of adjacent pairs of outer links pass, the said inner link fitting slidably and freely within the spaces between the outer links of the respective pairs. The spring $e$ is in compression between the one pivot pin and the end $c^4$ of the inner link, and when the bracelet expands the distance between said pivot pin and said end is reduced. In the contracted, or normal, condition of the bracelet the ends of the inner links abut, so that the movable ends $c^4$ must be slidably connected with the opposite slots $a^3$ $a^3$ of the pair of outer links, and this needs to be done after the soldering of the pivot pins has taken place. The end $c^4$ of the inner link is provided with a transverse coupling bar $f$, which is soldered to said end so as to provide bendable horns or ends $f^2$, $f^3$. These horns or ends, after the spring $e$ has been put into position within the hollowing of the inner link (by worming it by rotation through one of the side slots $c^2$ or $c^3$) are made to engage the opposite slots $a^3$ $a^3$ of the outer links in the manner represented in Figs. 1, 2 and 3, so as to connect the end $c^4$ of the inner link to the outer links radially of the pivot pins, and at the same time permit of the free expanding movement of the bracelet, but previously to said engagement of the horns or ends with the slots $a^3$ said horns take up a position represented clearly by Figs. 5 and 6 to permit of the inner link $c$ swinging radially upon the two pivot pins passing through it into a position represented in Fig. 5. While the link $c$ is in this position, Fig. 5 (the whole of the soldering in of the pivot pins having been completed) the spring $e$ is wormed in to the interior of the link through one of the slots $c^2$ or $c^3$. To permit of the link $c$ swinging radially the horns $f^2$ $f^3$ must first lie within the width of the inner link as in Fig. 6 so that when the spring is in position the end $c^4$ of the link can be again positioned between the two outer links of the pair to permit of the horns $f^2$ $f^3$ being turned into the slots $a^3$ $a^3$, as shown in Figs. 1 to 4, so as to stop any further radial swinging of the inner link on the pivot pins.

The formation of the coupling bar $f$ within the end of the inner link follows the inner curvature of the rounded end of the link, so that that particular end of the spring $e$ can come close in a manner enabling the fullest length of spring to be used, and with regard to this particular feature the absence of any distancing tube on the pivot pin (as would be needed if the pivot pin was not soldered in) lengthens the spring slightly, which lengthening, however small, is most effectual in result throughout the whole of the springs of the bracelet. In the case of a pattern of link with square ends instead of rounded the length of the springs would be increased.

The horns $f^2$ $f^3$ are bent from their positions Fig. 6 to Figs. 1 and 2 by hand. Instead of said horns being provided by the separate coupling piece $f$ soldered to the inner link they might be formed from the metal of the inner link itself, but the arrangement represented in the drawings is the most desirable one.

Having now described my invention what I claim and desire to secure by Letters Patent is:—

1. In a flexible and expansible bracelet, the combination of adjacent pairs of outer links having longitudinal guiding slots at their opposite inner sides, transverse pivot pins soldered at their ends to said outer links to rigidly connect and distance apart the links of each pair; a hollow inner link freely fitting the spaces between two adjacent pairs of outer links and oppositely side slotted for adjacent pivot pins of two pairs of outer links to pass through, a coiled spring contained within the inner link in compression between the one end of said link and one of the pivot pins and which can be put into position through one of the side slots of said inner link, and means provided upon the inner link at one end to permit of said end being put into effective engagement with the opposite slots of the pair of outer links after the soldering of the pivot pins, substantially as described.

2. In a flexible and expansible bracelet, the combination of adjacent pairs of outer links having longitudinal guiding slots at their opposite inner sides, transverse pivot pins soldered at their ends to said outer links to rigidly connect and distance apart the links of each pair; a hollow inner link freely fitting the spaces between two adjacent pairs of outer links and oppositely side slotted for adjacent pivot pins of two pairs of outer links to pass through, a coiled spring contained within the inner link in compression between the one end of said link and one of the pivot pins and which can be put into position through one of the side slots of said inner link, and bendable horns or ends provided upon the inner link at one end to permit of said end being put into engagement with opposite slots of the outer links after the pivot pins have been soldered, said horns being provided from an attached coupling bar soldered to the inner link end, substantially as described.

Signed at Birmingham, in the county of Warwick, England, this 8th day of March 1912.

KEVITT ROTHERHAM.

Witnesses:
   GEO. FUERY,
   BERNARD H. TINGLE.

Copies of this patent may be obtained for five cents each, by addressing the "Commissioner of Patents, Washington, D. C."